(12) United States Patent
Liu et al.

(10) Patent No.: US 10,767,741 B1
(45) Date of Patent: Sep. 8, 2020

(54) LINEAR TRANSMISSION DEVICE

(71) Applicant: HIWIN TECHNOLOGIES CORP., Taichung (TW)

(72) Inventors: Wei-Lun Liu, Taichung (TW); Shang-Hua Tsai, Taichung (TW)

(73) Assignee: Hiwin Technologies Corp., Taichung (TW)

(*) Notice: Subject to any disclaimer, the term of this patent is extended or adjusted under 35 U.S.C. 154(b) by 0 days.

(21) Appl. No.: 16/351,354

(22) Filed: Mar. 12, 2019

(51) Int. Cl.
*F16H 25/00* (2006.01)
*F16H 25/22* (2006.01)
*F16H 25/20* (2006.01)

(52) U.S. Cl.
CPC ..... *F16H 25/2219* (2013.01); *F16H 25/2015* (2013.01)

(58) Field of Classification Search
CPC ............. F16H 25/2219; F16H 25/2015; F16H 25/2204; F16H 25/2214; F16H 25/2233; F16H 25/2266; F16H 25/2276; F16H 25/228
USPC .......................................... 74/424.81–424.91
See application file for complete search history.

(56) References Cited

U.S. PATENT DOCUMENTS

| | | | |
|---|---|---|---|
| 4,103,222 A * | 7/1978 | Phillips | G01D 5/20 324/207.17 |
| 7,178,981 B2 | 2/2007 | Rudy et al. | |
| 2008/0257080 A1 | 10/2008 | Singh | |
| 2009/0009158 A1 | 1/2009 | Singh | |

FOREIGN PATENT DOCUMENTS

| | | |
|---|---|---|
| DE | 19713688 A1 | 10/1998 |
| DE | 10304868 A1 | 8/2003 |
| DE | 202005021641 U1 | 2/2009 |
| DE | 102010050175 A1 | 5/2012 |
| JP | 6-69502 U | 9/1994 |
| JP | 3936519 B2 | 12/2001 |
| JP | 3936519 B2 | 6/2007 |
| JP | 2007225024 A | 9/2007 |
| JP | 2009074982 A | 4/2009 |
| JP | 2013200032 A | 10/2013 |
| JP | 2014114944 A | 6/2014 |
| JP | 2014159847 A | 9/2014 |
| JP | 2017194134 A | 10/2017 |
| KR | 1020040002653 A | 1/2004 |
| TW | 200722645 A | 6/2007 |

* cited by examiner

*Primary Examiner* — Victor L MacArthur
(74) *Attorney, Agent, or Firm* — Wang Law Firm, Inc.

(57) ABSTRACT

A linear transmission device includes: an elongated shaft member, a moving module, a rolling unit, a return assembly, a sensor and a data receiving unit. The linear transmission device has a simple structure. The sensor is disposed at the junction of the first return pipe and the second return pipe of the return assembly to timely detect the change in the distance between the rolling elements, which can determine whether there is an abnormality in the shape of the spacers. With the sensor outputting detecting signals, it can stop the terminal immediately to confirm the condition of the workpieces and the machine, avoiding the structural damage of the machine and the workpiece caused by the continuous operation. The sensor can also serve as a medium for transferring data, further facilitating maintenance.

10 Claims, 9 Drawing Sheets

LINEAR TRANSMISSION DEVICE

BACKGROUND

Field of the Invention

The present invention relates to a linear transmission device, and more particularly to a linear transmission device which can directly detect the change in the distance between the rolling elements.

Related Prior Art

Figure 1A:
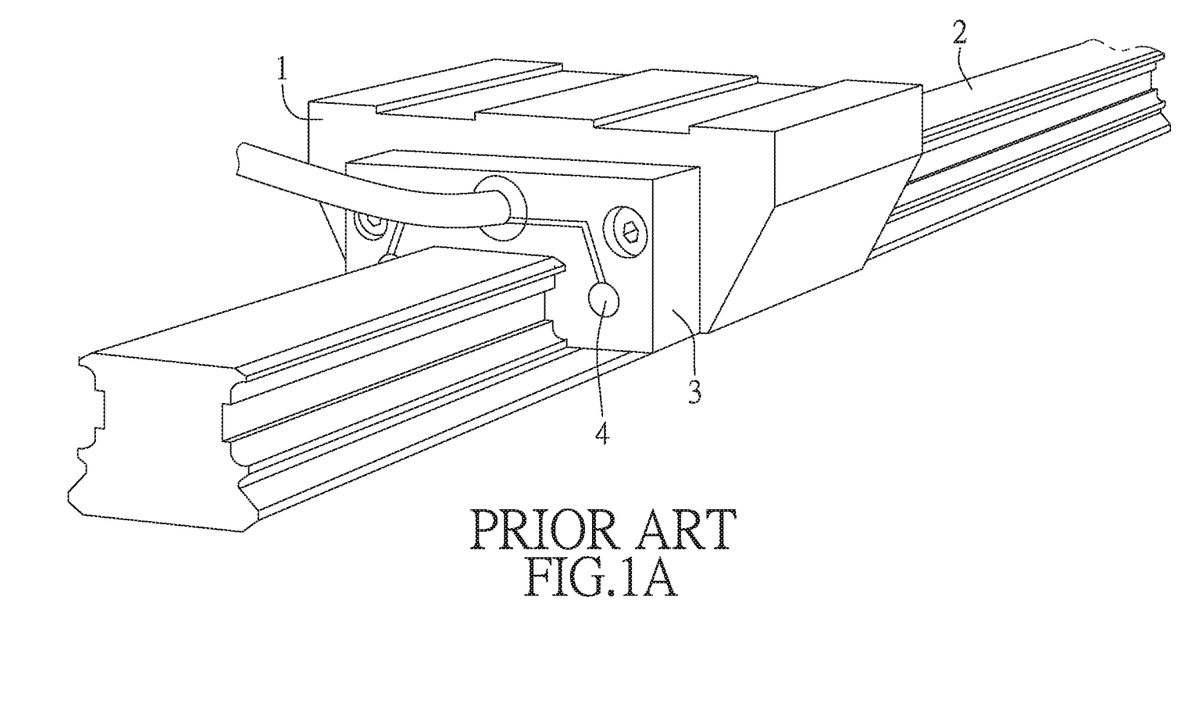
FIG. 1A is one of the drawings of a linear roller bearing of the U.S. Pat. No. 7,178,981 B2.

Referring to FIG. 1A, which is a drawing of a linear roller bearing of the related art (U.S. Pat. No. 7,178,981 B2) having a guide carriage 1 which can be mounted on a guide rail 2 in a rolling manner via balls (not shown). The guide carriage 1 is provided with at least one rolling passage (not shown) for the balls, the rolling passage includes a support passage (not shown) for supporting the balls, and a deflecting channel (not shown) that is disposed in the end elements 3 of the guide carriage 1. The balls in the rolling passage are subjected to displacement resistance in the direction of rotation. The end elements 3 are respectively provided with a sensor 4 for detecting the displacement resistance caused by the deformation of the cover plate during the displacement of the balls, so as to determine whether there is abnormality. However, the installation of the above-described sensor 4 generally increases the length of the guide carriage 1, which in turn increases the cost and complexity of the structure, which will affect the travel length.

Figure 1B:
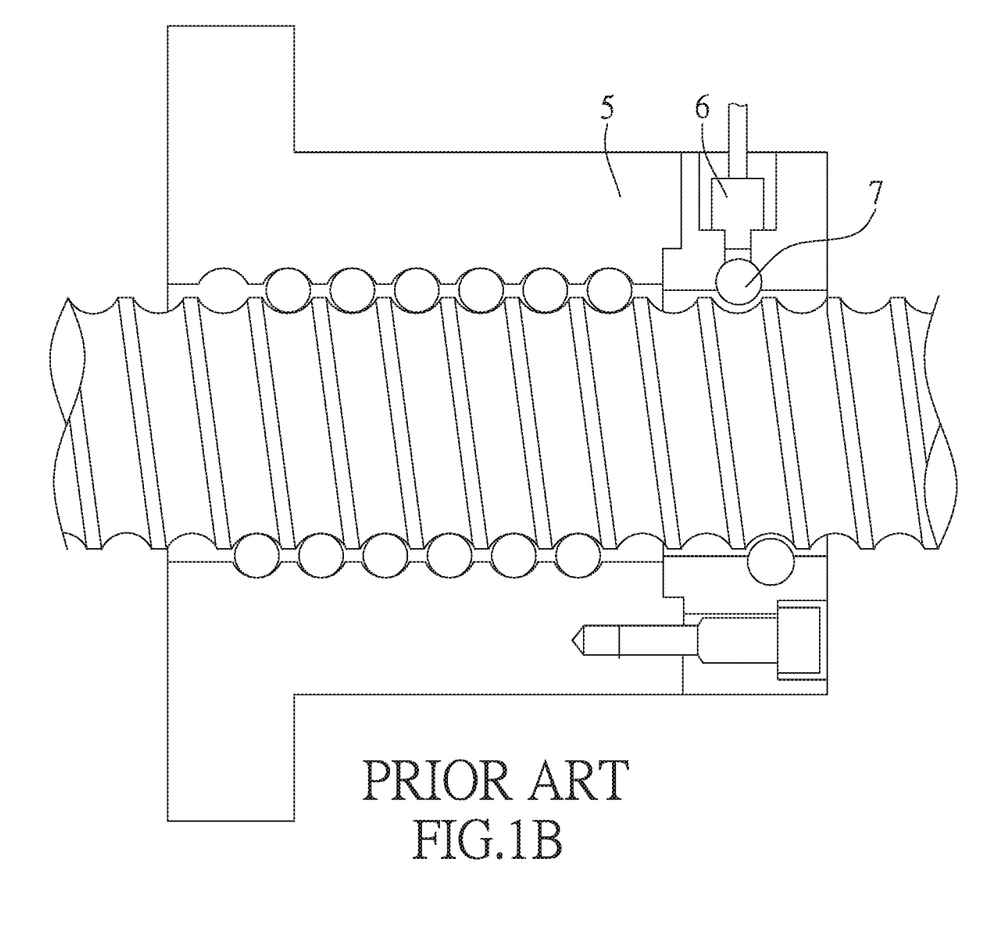
FIG. 1B is one of the drawings of a ball screw with a sensing device of Japanese Patent (JP2007225024)

Please refer to FIG. 1B, which is one of the drawings of the Japanese patent (JP2007225024) showing a ball screw with a sensing device, wherein the sensing device 6 is provided in a recess of a nut 5 (capacitive type, optical type)) for measuring the displacement of the balls 7, and then determining the stress condition of the nut 5. However, the structure of the sensing device 6 changes the size of the nut 5, so that the outer diameter of the nut 5 is increased, which in turn affects the travel length of the nut 5.

Referring then to Japanese Patent No. JP3936519, which discloses a technical content in which a vibration sensor is provided at a bend of an outer circulation member of a ball screw to detect the running condition of the balls, wherein special boring processing has to be performed on the nut to install the vibration sensor, and the boring processing is complicated and the cost is higher. Moreover, installing the vibration sensor at the bend of the outer circulation member, can only detect the stress change caused by the ball striking the wall surface at the bend of the outer circulation member to know the running condition of the balls (for example, insufficient lubrication may cause the ball to run unsmoothly), it is impossible to measure the change in the distance between the balls, and it is impossible to know whether the balls are jammed or not.

The remaining patents, such as Japanese Patent Nos JPA2014159847 and JPA2013200032, all have the above-mentioned disadvantages. Therefore, there is still room for improvement in the conventional linear transmission devices.

SUMMARY

One objective of the present invention is to provide a linear transmission device which can directly detect the change in the distance between the rolling elements, and further know whether the spacers between the rolling elements are collapsed or jammed, thus avoiding the shutdown of the machine caused by the damage to the linear transmission device.

To achieve the above objective, a linear transmission device in accordance with the present invention comprises:

an elongated shaft member extending along an axial direction and having a helical groove;

a moving module movably sleeved onto the elongated shaft member and reciprocally displaceable along the axial direction, and having a rolling groove which is aligned with the helical groove to form a load path;

a rolling unit disposed in the load path and having a plurality of rolling elements and a plurality of spacers, there is one said spacer between each two neighboring said rolling elements;

a return assembly inserted in the moving module and in communication with the load path, having a first return pipe, a second return pipe communicating with the first return pipe, and a return passage which extends through the first return pipe and the second return pipe and is provided for the rolling unit to circulate;

at least one sensor disposed on the moving module and located at a joint between the first return pipe and the second return pipe, when the rolling unit moves in the return passage, the at least one sensor is able to detect the change of a distance between the rolling elements and output a detecting signal; and a data receiving unit signal connected to the at least one sensor for receiving the detecting signal from the at least one sensor.

Preferably, the linear transmission device is a ball screw or a linear guideway.

Preferably, the linear transmission device is a ball screw and further comprises a fixing cover disposed on an outer surface of the moving module to cover the return assembly and the at least one sensor, the fixing cover has a receiving groove for receiving the return assembly, and at least one recess recessed in an inner surface of the receiving groove to accommodate the at least one sensor.

Preferably, the sensor is wirelessly connected to the data receiving unit to achieve signal transmission.

Preferably, the sensor is an inductance type sensor or a light inductive type sensor.

Preferably, the first return pipe has a first connecting end and a first return end, the second return pipe has a second connecting end and a second return end, the return passage extends through the first connecting end and the first return end of the first return pipe, and the second connecting end and the second return end of the second return pipe, the first connecting end of the first return pipe is connected to the second connecting end of the second return pipe, the first return end of the first return pipe and the second return end of the second return pipe are connected to two ends of the load path, respectively, the at least one sensor is disposed at one side of the first connecting end of the first return pipe and the second connecting end of the second return pipe.

Preferably, the first connecting end of the first return pipe abuts against the second connecting end of the second return pipe.

Preferably, the first connecting end of the first return pipe is spaced apart from the second connecting end of the second return pipe by 0.1 mm to 0.2 mm.

Preferably, a part of the return passage that extends through the first connecting end and the second connecting end is straight linear.

Preferably, the return assembly is made of plastic.

The invention provides a linear transmission device consisting of the elongated shaft member, the moving module, the rolling unit, the return assembly, the sensor and the data receiving unit. Therefore, the present invention has a simple structure. The sensors are disposed at the junction of the first return pipe and the second return pipe of each of the return assemblies to timely detect the change in the distance between the rolling elements, which can determine whether there is an abnormality in the shape of the spacers. With the sensors outputting detecting signals, it can stop the terminal immediately to confirm the condition of the workpieces and the machine, avoiding the structural damage of the machine and the workpiece caused by the continuous operation. The sensors can also serve as a medium for transferring data, further facilitating maintenance.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

The present invention will be clearer from the following description when viewed together with the accompanying drawings, which show, for purpose of illustrations only, the preferred embodiment in accordance with the present invention.

Figure 7:
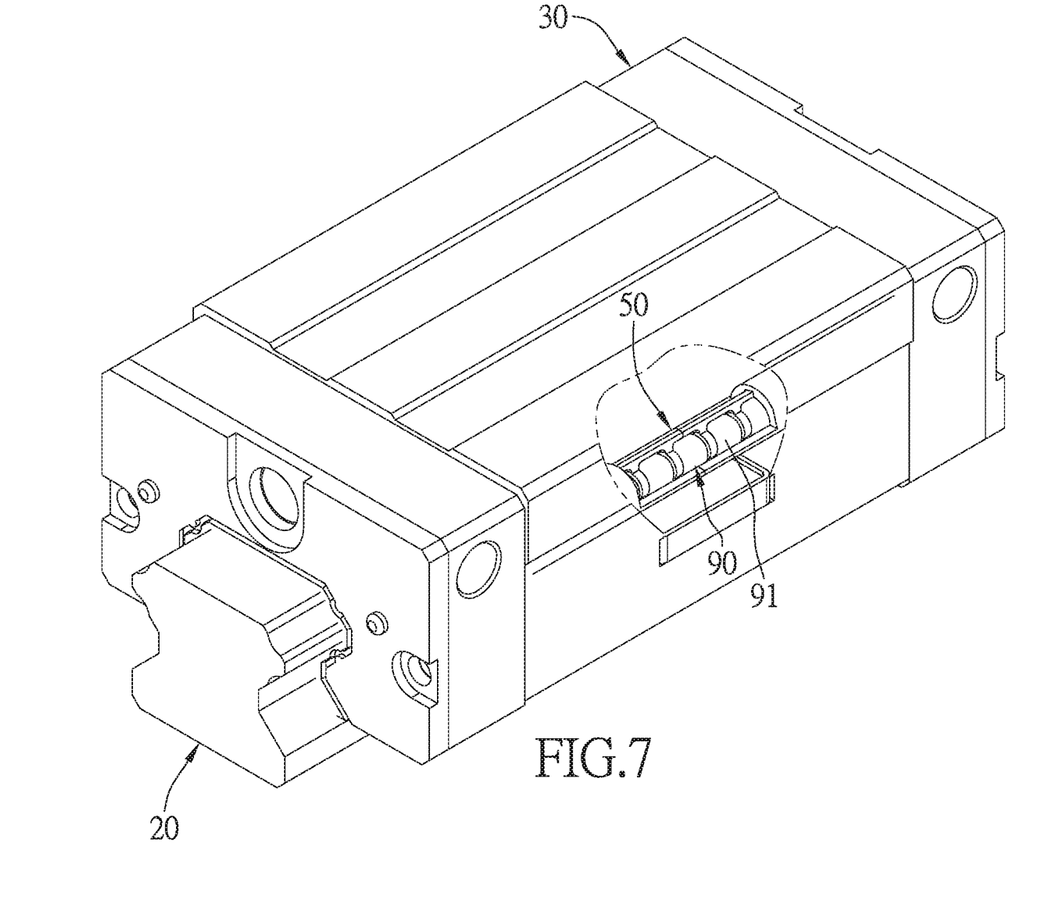
FIG. 7 is a perspective view of a third embodiment of the present invention showing the linear transmission device as a linear guideway.

Referring to FIGS. 2-5, a linear transmission device in accordance with a preferred embodiment of the present invention is shown, the linear transmission device is exemplified by a ball screw, but is not limited thereto, or is a linear guideway as shown in FIG. 7, wherein the linear transmission device comprises: an elongated shaft member 20, a moving module 30, a rolling unit 40, two return assemblies 50, four sensors 60, a fixing cover 70, a data receiving unit 80.

The elongated shaft member 20 extends along an axial direction X. The elongated shaft member 20 of the embodiment is a screw, and has a screw annular surface 21 and a helical groove 22 formed in the screw annular surface 21. The moving module 30 is movably sleeved onto the elongated shaft member 20 and reciprocally displaceable along the axial direction X, and has a rolling groove 31 which is aligned with the helical groove 22 to form a load path. The moving module 30 of the embodiment is a nut.

The rolling unit 40 is disposed in the load path and has a plurality of rolling elements 41 and a plurality of spacers 42. There is one spacer 42 between each two rolling elements 41. In this embodiment, the rolling elements 41 are balls. In other embodiments, the rolling elements 41 can be rollers; the spacers 42 are cylindrical, and a groove for accommodating a part of the rolling elements 41 is recessed on both sides of the spacer 42 respectively.

The two return assemblies 50 are made of plastic material. The two return assemblies 50 are disposed on an outer surface of the moving module 30 and communicate with the load path. In this embodiment, each of the return assemblies 50 has two ends inserted in the moving module 30, and includes a first return pipe 51, a second return pipe 52 communicating with the first return pipe 51, and a return passage 53 which extends through the first return pipe 51 and the second return pipe 52 and is provided for the rolling unit 40 to circulate.

In this embodiment, the two return assemblies 50 are substantially identical in structure, and thus only one of the return assemblies 50 is further described. The first return pipe 51 has a first connecting end 512 and a first return end 514. The second return pipe 52 has a second connecting end 522 and a second return end 524. The return passage 53 extends through the first connecting end 512 and the first return end 514 of the first return pipe 51, and the second connecting end 522 and the second return end 524 of the second return pipe 52. The part of the return passage 53 that extends through the first connecting end 512 and the second connecting end 522 is straight linear. The first connecting end 512 of the first return pipe 51 corresponds to the second connecting end 522 of the second return pipe 52. In this embodiment, the first connecting end 512 of the first return pipe 51 is abutted against the second connecting end 522 of the second return pipe 52, but are not limited thereto, the first connecting end 512 of the first return pipe 51 and the second connecting end 522 of the second return pipe 52 can also be separated from each other by a small gap, that is, they do not contact each other. The first return end 514 of the first return pipe 51 and the second return end 524 of the second return pipe 52 are connected to two ends of the load path, respectively.

In other embodiments, the linear transmission device may also have only one return assembly 50.

The elongated shaft member (screw), the moving module (nut), the two return assemblies, and the rolling unit are assembled and operated in a conventional way, and this is not the focus of this invention. Therefore, the detailed structure, assembly method and operation of the components (the long shaft member, the moving module, the two return assemblies, and the rolling unit) are not described in detail.

Figure 3A:
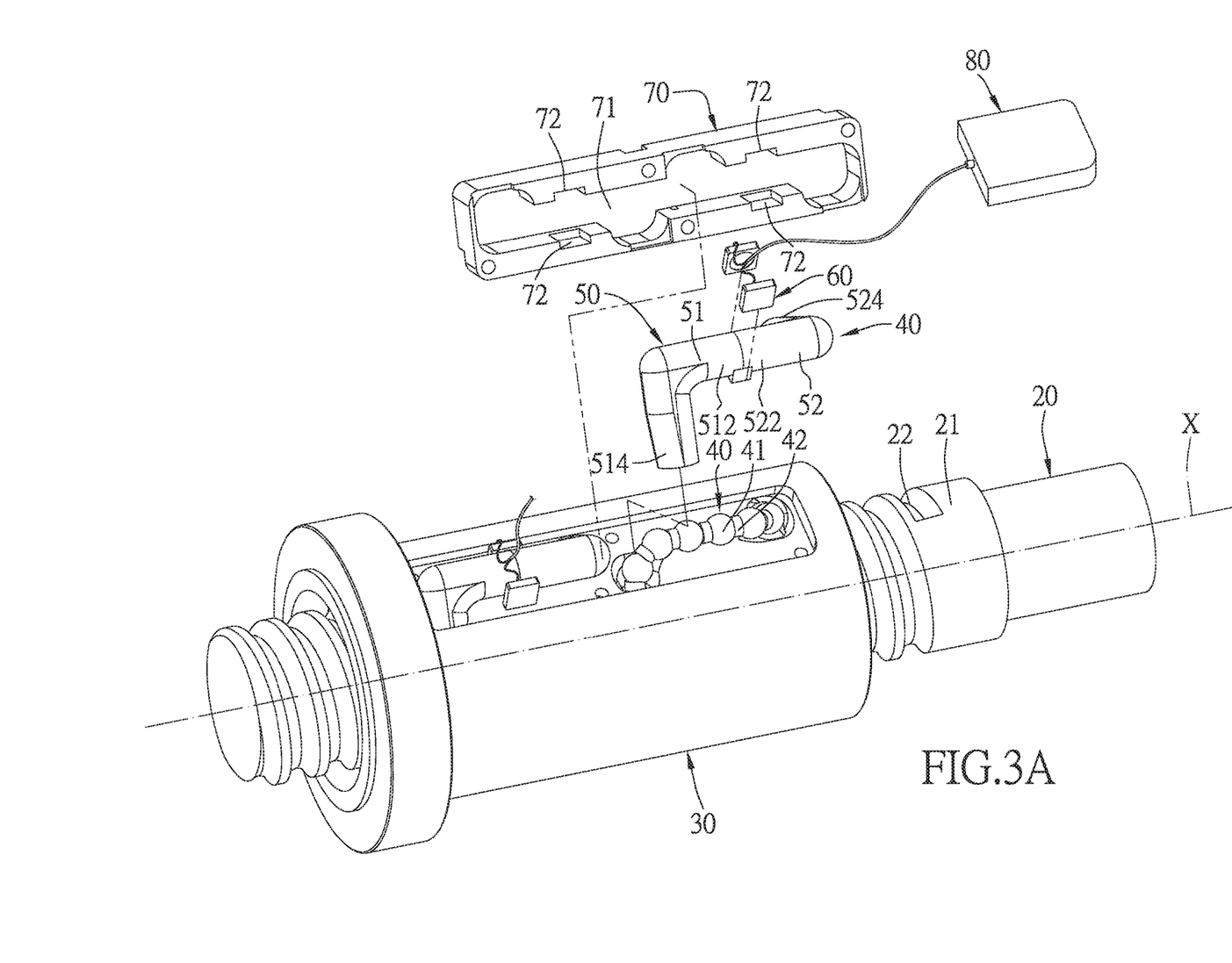
FIG. 3A is an exploded view (1) of the first embodiment of the present invention.
Figure 3B:
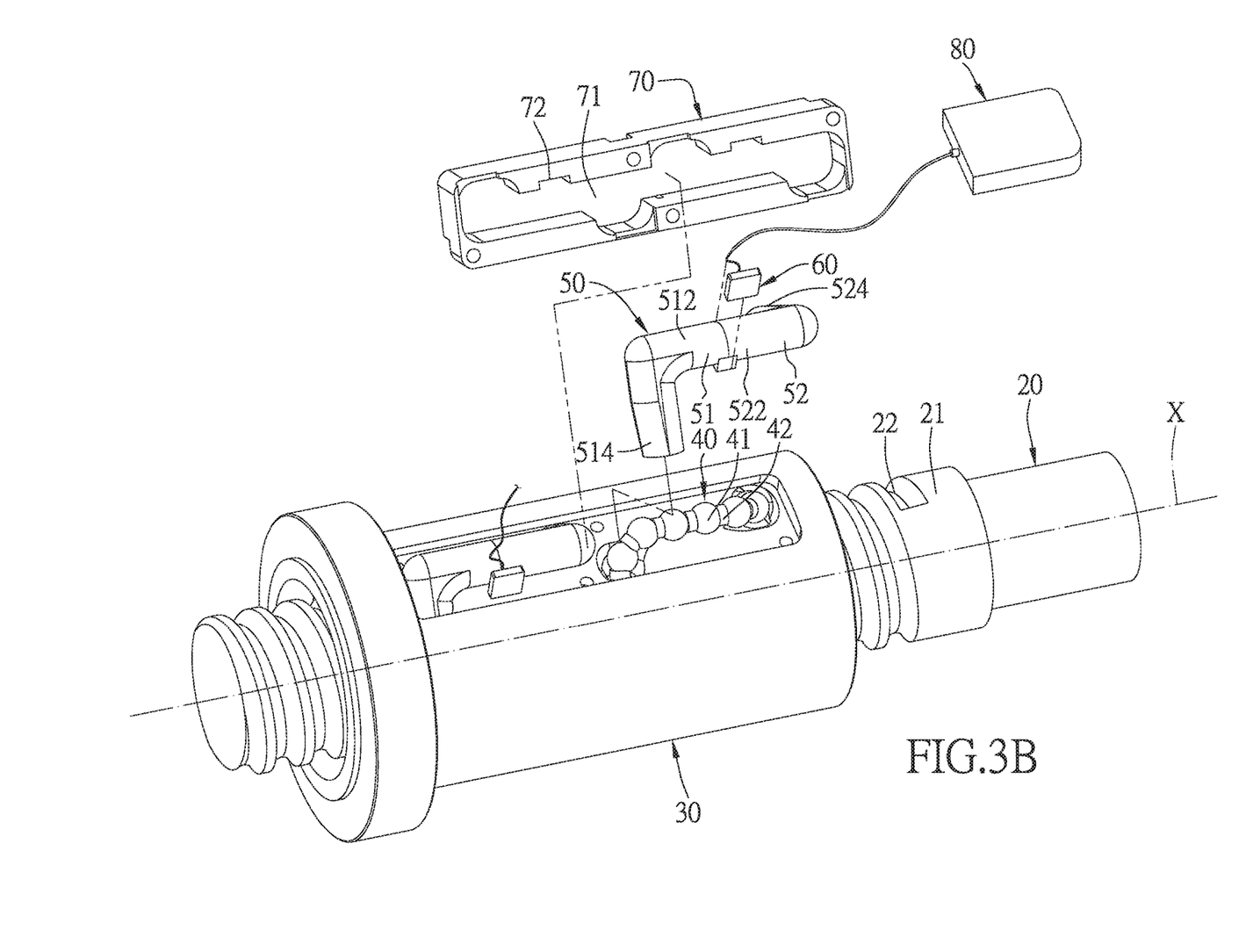
FIG. 3B is an exploded view (2) of the first embodiment of the present invention.
Figure 4:
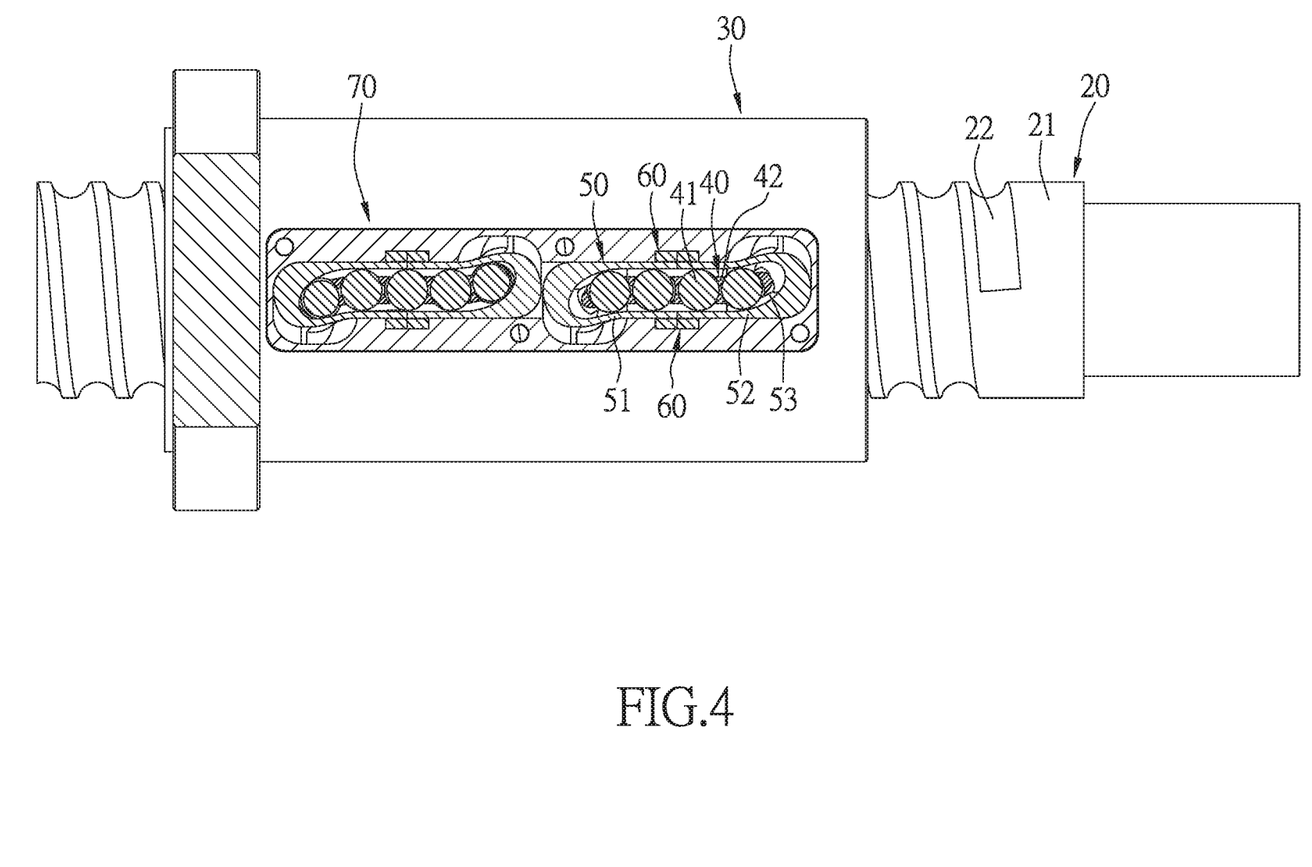
FIG. 4 is a cross-sectional view (1) of the first embodiment of the present invention.
Figure 5:
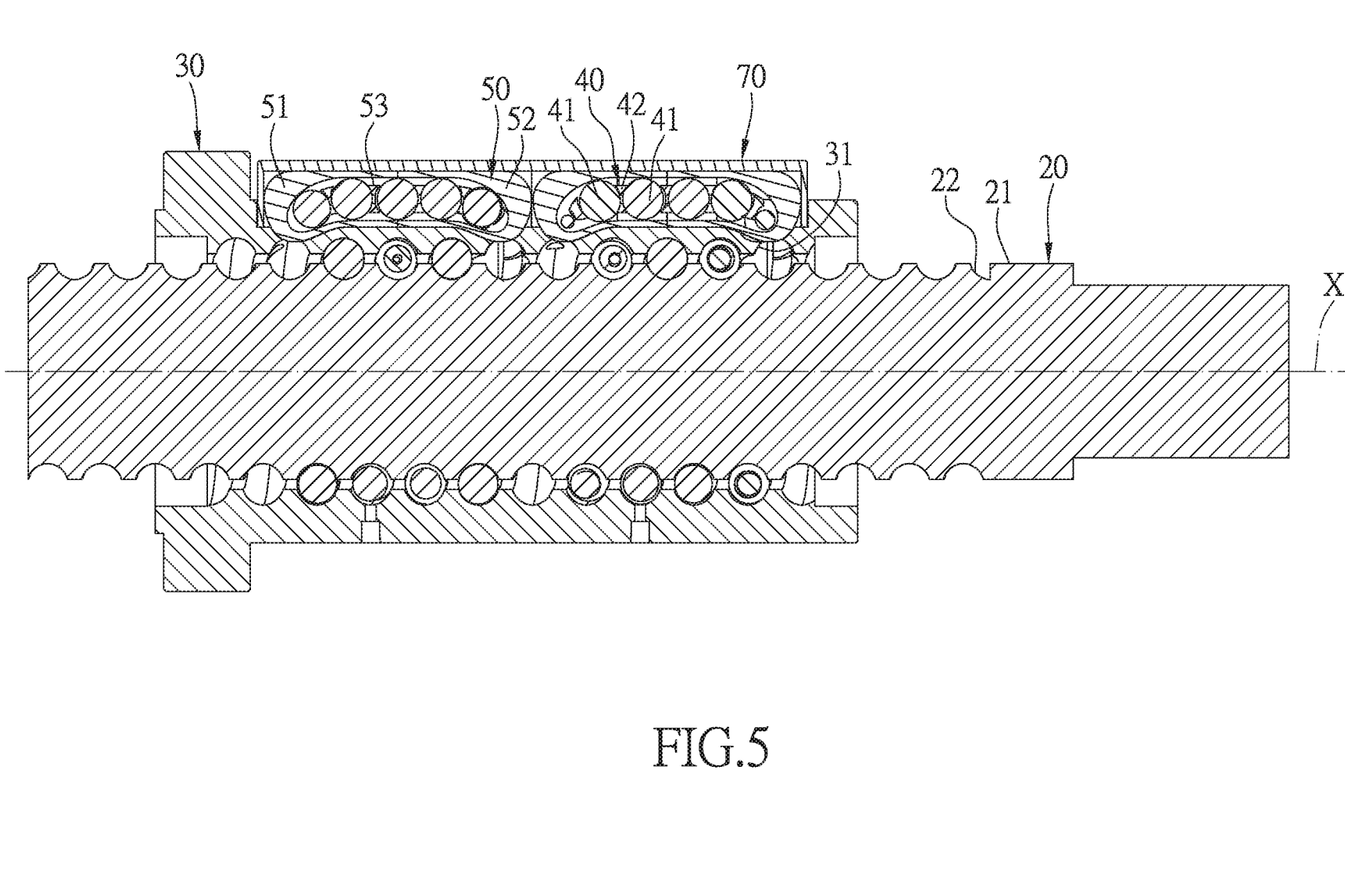
FIG. 5 is a cross-sectional view (2) of the first embodiment of the present invention.

The four sensors 60 are disposed in pairs on opposite sides of the outer surface of the return assemblies 50, and located at the joint between the first return pipe 51 and the second return pipe 52 of each of the return assemblies 50, and more specifically, the four sensors 60 are respectively located in pairs on opposite sides of a position where the first connecting end 512 of the first return pipe 51 and the second connecting end 522 of the second return pipe 52 are connected. Of course, this is not a limitation. Referring to FIG. 3B, in another preferred embodiment, there can also be only one sensor 60 disposed at one side at a position where the first connecting end 512 of the first return pipe 51 and the second connecting end 522 of the second return pipe 52 are connected, and it can also achieve the same effect. When the rolling unit 40 moves in the return passage 53, each of the sensors 60 can detect the change of the distance between the rolling elements 41 and output a detecting signal to determine whether gaps between each two adjacent rolling elements 41 are different from each other to determine whether each of the spacers 42 between the rolling elements 41 is damaged or falls and laterally disposed. Besides, since the part of the return passage 53 that extends through the first connecting end 512 and the second connecting end 522 is straight linear, each of the rolling elements 41 and the spacers 42 will move in a substantially linear manner through the part of the return passage 53 that extends through the first connecting end 512 and the second connecting end 522, so that the detecting signal detected by the sensors 60 are relatively accurate. In this embodiment, the sensors 60 are exemplified by inductance type, but are not limited thereto, or can also be light inductive type. The inductance type is a device that realizes measurement by utilizing the change of self-inductance or mutual inductance of the coil, which has the advantages of low structural cost, customizable external dimensions, large output power, strong anti-interference ability, low requirements on the working environment, high resolution and good stability. The light inductive sensor utilizes various properties of light to detect the presence or absence of an object or a change in surface state, etc., and has the advantages of long detection distance, less restriction conditions for detecting an object, completing detection in a non-contact manner, and higher resolution. When the spacer 42 located between the two rolling elements 41 is displaced and tilted to cause the distance between the two rolling elements 41 to exceed the safety value (the safety value is 2 mm in this embodiment, which is not limited thereto in other embodiments, and may vary for different design purposes), it is highly probable that the rolling unit 40 in the return passage 53 and the load path will be jammed to cause equipment damage and shutdown. Through the design of the sensors 60, it is possible to timely diagnose the abnormality of the linear transmission device, and let the terminal immediately stop to confirm the condition of the workpieces and the machine, avoiding the structural damage of the machine and the workpiece caused by the continuous operation.

It is to be noted that, in this embodiment, the first connecting end 512 of the first return pipe 51 abuts against the second connecting end 522 of the second return pipe 52. In other preferred embodiments, the first connecting end 512 of the first return pipe 51 is spaced apart from the second connecting end 522 of the second return pipe 52 by 0.1 mm to 0.2 mm, so that the sensors 60 can measure the change of the distance between the rolling elements 41 by the gap between the first connecting end 512 and the second connecting end 522 to improve the precision and effect of the sensing.

A fixing cover 70 is disposed on the outer surface of the moving module 30 to cover the two return assemblies 50 and the four sensors 60, and has a receiving groove 71 for receiving the return assemblies 50, and four recesses 72 recessed from an inner surface of the receiving groove 71 to accommodate the four sensors 60.

Specifically, most of the conventional monitoring methods use an adhesive accelerometer to monitor the operation of the ball screw, but often face the problem of where the sensing component is placed and whether the signal strength is sufficient. Therefore, the present invention improves the above defects. The inner surface of the receiving groove 71 is recessed with four recesses 72 to accommodate the four sensors 60. In addition to the fact that the four sensors 60 can be fixed, the sensors 60 can be brought closer to the two return assemblies 50, thereby effectively reducing signal interference to maintain stable signal.

Therefore, the present invention fully utilizes the original space of the fixing cover 70 to accommodate the four sensors 60, so that not only the size of the original shape of the elongated shaft member 20 is not changed, but also the design of the original machine is not affected, as a result, the change of distance between each two neighboring rolling elements 41 is instantly detected, thereby avoiding shutdown of the machine.

Figure 6:
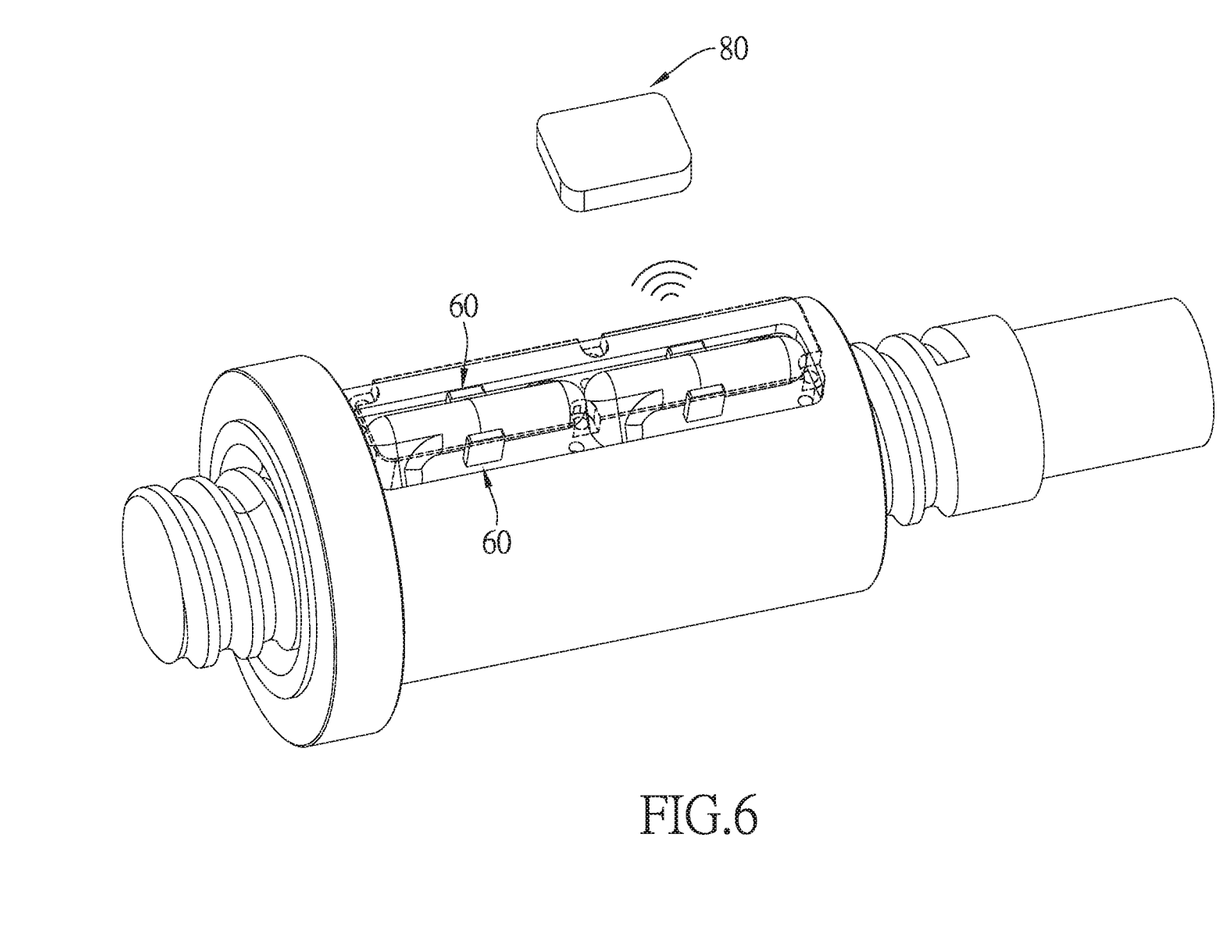
FIG. 6 is a perspective view of a second embodiment of the present invention, showing that the sensor and the data receiving unit are wirelessly connected for signal transmission.

The data receiving unit 80 is signal connected to the four sensors 60 for receiving the detecting signal from the four sensors 60. This embodiment is a wired transmission as an example, but is not limited thereto, as shown in FIG. 6, the four sensors 60 is wirelessly connected to the data receiving unit 80 via Wi-Fi, Bluetooth, RF, ZigBee, LoRa, WiGig, 4G or 5G to achieve signal transmission, thereby eliminating the cumbersome physical wiring project and the space of wiring, without considering the installation wiring.

Figure 2:
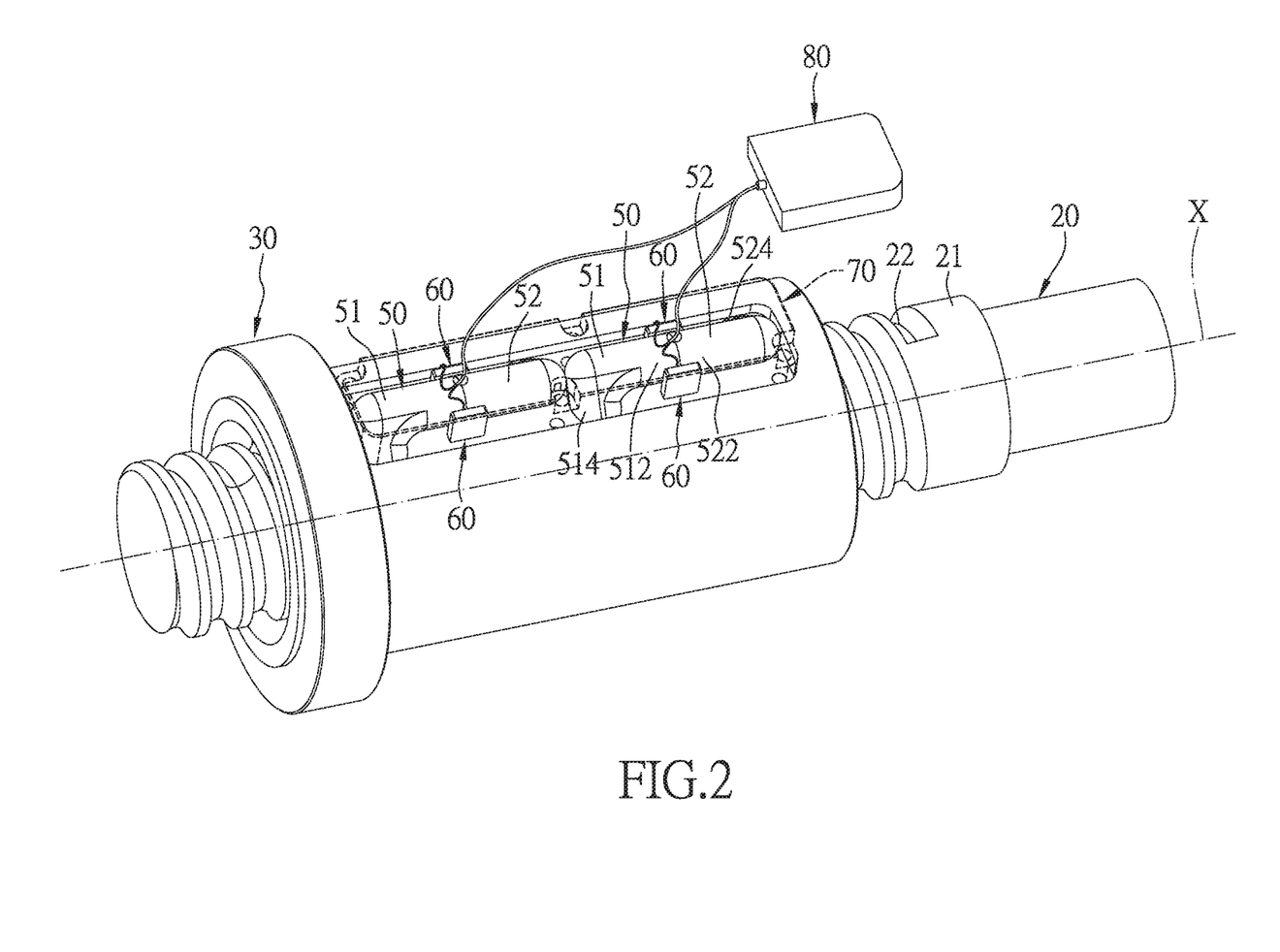
FIG. 2 is a perspective view of a first embodiment of the present invention showing the linear transmission device as a ball screw.

In addition, the above embodiment is described by using a ball screw as an example. Referring to FIGS. 2 and 7, the linear transmission device of the embodiment can also be applied to a linear guideway, so that the elongated shaft member 20 is a rail, the moving module 30 is a slider, and the two return assemblies 50 are disposed in the moving module 30. When a chain holder 90 is broken, the gaps between the rolling elements 91 at the break are increased. The sensors 60 can detect the abnormal shape of the chain holder 90, which can also achieve the same effect as described above.

The above description is the configuration description of each main component of the embodiment of the present invention. The effects and functions of the present invention are explained below.

Therefore, the present invention has a simple structure. The sensors 60 are disposed at the junction of the first return pipe 51 and the second return pipe 52 of each of the return assemblies 50 to timely detect the change in the distance between the rolling elements 41, which can determine whether there is an abnormality in the shape of the spacers 42. With the sensors 60 outputting detecting signals, it can stop the terminal immediately to confirm the condition of the workpieces and the machine, avoiding the structural damage of the machine and the workpiece caused by the sensors 60 can also serve as a medium for transferring data, further facilitating maintenance.

While we have shown and described various embodiments in accordance with the present invention, it is clear to those skilled in the art that further embodiments may be made without departing from the scope of the present invention.

What is claimed is:
1. A linear transmission device comprising:
   an elongated shaft member extending along an axial direction and having a helical groove;
   a moving module movably sleeved onto the elongated shaft member and reciprocally displaceable along the axial direction, and having a rolling groove which is aligned with the helical groove to form a load path;
   a rolling unit disposed in the load path and having a plurality of rolling elements and a plurality of spacers, there is one said spacer between each two neighboring said rolling elements;

a return assembly inserted in the moving module and in communication with the load path, having a first return pipe, a second return pipe communicating with the first return pipe, and a return passage which extends through the first return pipe and the second return pipe and is provided for the rolling unit to circulate;

at least one sensor disposed on the moving module and located at a joint between the first return pipe and the second return pipe, when the rolling unit moves in the return passage, the at least one sensor is able to detect the change of a distance between the rolling elements and output a detecting signal; and a data receiving unit signal connected to the at least one sensor for receiving the detecting signal from the at least one sensor.

2. The linear transmission device as claimed in claim 1, wherein the linear transmission device is a ball screw or a linear guideway.

3. The linear transmission device as claimed in claim 1, wherein the linear transmission device is a ball screw and further comprises a fixing cover disposed on an outer surface of the moving module to cover the return assembly and the at least one sensor, the fixing cover has a receiving groove for receiving the return assembly, and at least one recess recessed in an inner surface of the receiving groove to accommodate the at least one sensor.

4. The linear transmission device as claimed in claim 1, wherein the sensor is wirelessly connected to the data receiving unit to achieve signal transmission.

5. The linear transmission device as claimed in claim 1, wherein the sensor is an inductance type sensor or a light inductive type sensor.

6. The linear transmission device as claimed in claim 1, wherein the first return pipe has a first connecting end and a first return end, the second return pipe has a second connecting end and a second return end, the return passage extends through the first connecting end and the first return end of the first return pipe, and the second connecting end and the second return end of the second return pipe, the first connecting end of the first return pipe corresponds to the second connecting end of the second return pipe, the first return end of the first return pipe and the second return end of the second return pipe are connected to two ends of the load path, respectively, the at least one sensor is disposed at one side of the first connecting end of the first return pipe and the second connecting end of the second return pipe.

7. The linear transmission device as claimed in claim 6, wherein the first connecting end of the first return pipe abuts against the second connecting end of the second return pipe.

8. The linear transmission device as claimed in claim 6, wherein the first connecting end of the first return pipe is spaced apart from the second connecting end of the second return pipe by 0.1 mm to 0.2 mm.

9. The linear transmission device as claimed in claim 6, wherein a part of the return passage that extends through the first connecting end and the second connecting end is straight linear.

10. The linear transmission device as claimed in claim 1, wherein the return assembly is made of plastic.

* * * * *